(12) United States Patent
Sutton et al.

(10) Patent No.: US 6,916,352 B2
(45) Date of Patent: Jul. 12, 2005

(54) METHOD OF PREVENTING AIR BYPASS IN A FILTER BANK AND A FILTER ASSEMBLY

(75) Inventors: Darrel Sutton, Sherwood Park (CA); Arren Granville, Sherwood Park (CA); Mike Benoit, Sherwood Park (CA)

(73) Assignee: B.G.E. Service & Supply Ltd., Edmonton (CA)

( * ) Notice: Subject to any disclaimer, the term of this patent is extended or adjusted under 35 U.S.C. 154(b) by 0 days.

(21) Appl. No.: 10/614,631

(22) Filed: Jul. 7, 2003

(65) Prior Publication Data

US 2005/0005768 A1 Jan. 13, 2005

(30) Foreign Application Priority Data

May 30, 2003 (CA) .............................................. 2430510

(51) Int. Cl.[7] .......................... B01D 35/30; B01D 46/00
(52) U.S. Cl. ............................. 55/483; 55/484; 55/502; 55/503; 55/511; 55/DIG. 31
(58) Field of Search ........................ 55/483, 484, 502, 55/503, 511, 490, 495, 501, 385.2, DIG. 31, 504, 506, 507, 517, 521

(56) References Cited

U.S. PATENT DOCUMENTS

| | | | | |
|---|---|---|---|---|
| 2,252,724 A | * | 8/1941 | Myers | .......................... 55/502 |
| 4,233,044 A | * | 11/1980 | Allan | ........................... 55/355 |
| 4,312,648 A | | 1/1982 | Day | |
| 5,059,218 A | * | 10/1991 | Pick | ............................... 96/66 |
| 5,298,044 A | | 3/1994 | Sutton et al. | |
| 6,099,612 A | | 8/2000 | Bartos | |
| 6,389,994 B1 | * | 5/2002 | Chase et al. | ................. 110/172 |
| 6,447,566 B1 | * | 9/2002 | Rivera et al. | .................. 55/482 |
| 6,485,538 B1 | * | 11/2002 | Toyoshima | ................... 55/490 |
| 6,554,880 B1 | * | 4/2003 | Northcutt | .................... 55/385.2 |
| 6,562,095 B1 | * | 5/2003 | Toreklsson et al. | ........... 55/483 |

FOREIGN PATENT DOCUMENTS

CA            2097274         8/1999

* cited by examiner

*Primary Examiner*—Minh-Chau T. Pham
(74) *Attorney, Agent, or Firm*—Davis & Bujold, P.L.L.C.

(57) ABSTRACT

A method of preventing air bypass in a filter bank and a filter assembly in accordance with the teachings of the method. Filter panels are inserted through an access opening of a filter bank. As the filter panels are inserted they are connected in side by side relation with "I" shaped connectors. The sides of adjoining filter panels are inserted into opposed channels of the "I" shaped connectors. The positioning of the "I" shaped connector prevents air bypass between the sides of adjacent filter panels.

5 Claims, 5 Drawing Sheets

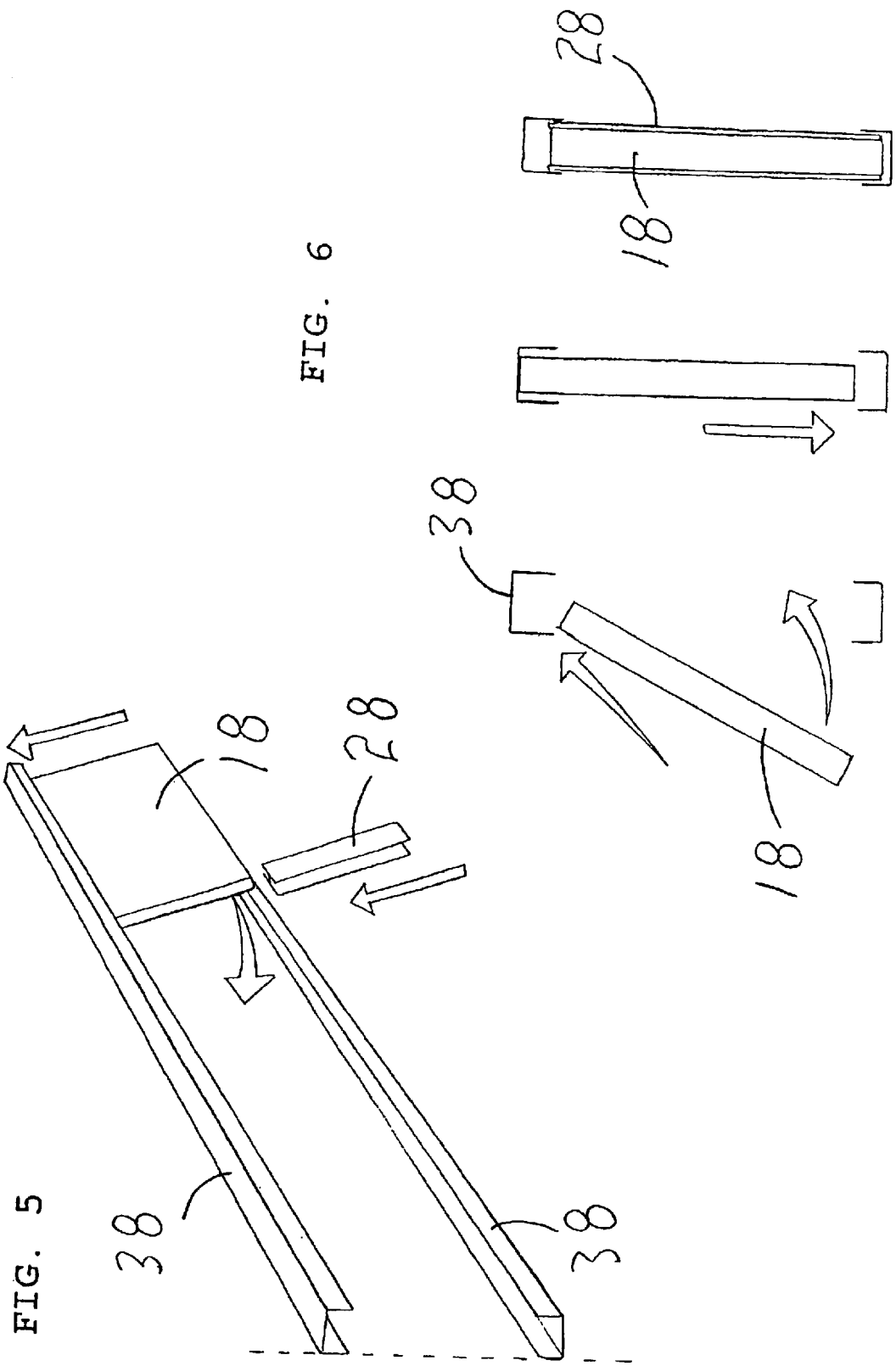

US 6,916,352 B2

METHOD OF PREVENTING AIR BYPASS IN A FILTER BANK AND A FILTER ASSEMBLY

FIELD OF THE INVENTION

The present invention relates to a method of preventing air bypass in a filter bank in which filters are positioned in side by side relation along a filter track, and a filter assembly constructed in accordance with the teachings of the method.

BACKGROUND OF THE INVENTION

In filter banks, filter panels are inserted through an access opening into a filter track. The filter panels are arranged along the filter track in side by side relation.

Air will always follow the path of least resistance. A problem presently being encountered with filter banks is that of air passing between the filter panels and bypassing the filters altogether.

SUMMARY OF THE INVENTION

What is required is a method of preventing air bypass in filter banks, and a filter assembly constructed in accordance with the teachings of the method.

According to a first aspect of the present invention there is provided a method of preventing air bypass in a filter bank. A first step involves providing a filter bank having a filter track with an access opening. A second step involves providing rectangular filter panels. Each filter panel has an opposed pair of first sides, an opposed pair of second sides, two opposed faces, and a width between the two opposed faces. A third step involves providing "I" shaped connectors having a length substantially the same as the length of the opposed pair of second sides of the filter panels. The "I" shaped connectors have opposed channels with an inner dimension substantially equal to the width of the filter panels. A fourth step involves inserting the filter panels through the access opening into the filter bank and sequentially connecting the filter panels in side by side relation with the "I" shaped connectors by placing the second sides of adjoining filter panels into the opposed channels of the "I" shaped connectors. The positioning of the "I" shaped connector prevents air bypass between the sides of adjacent filter panels.

According to a second aspect of the present invention there is provided a filter assembly which includes a filter bank having a filter track adapted to receive filter panels in side by side relation through an access opening. Rectangular filter panels are provided. Each of the filter panels has an opposed pair of first sides, an opposed pair of second sides, two opposed faces, and a width between the two opposed faces. "I" shaped connectors are provided having a length substantially the same as the length of the opposed pair of second sides of the filter panels and opposed channels having an inner dimension substantially equal to the width of the filter panels. The filter panels are connected in side by side relation by the "I" shaped connectors with the second sides of adjoining filter panels in the opposed channels of the "I" shaped connectors. The positioning of the "I" shaped connector prevents air bypass between the sides of adjacent filter panels.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 5 is a perspective view of a front loading filter bank.

FIG. 6 is an end view in sequence illustrating a filter being loaded in a back loading filter bank.

DETAILED DESCRIPTION OF THE PREFERRED EMBODIMENT

Figure 1:
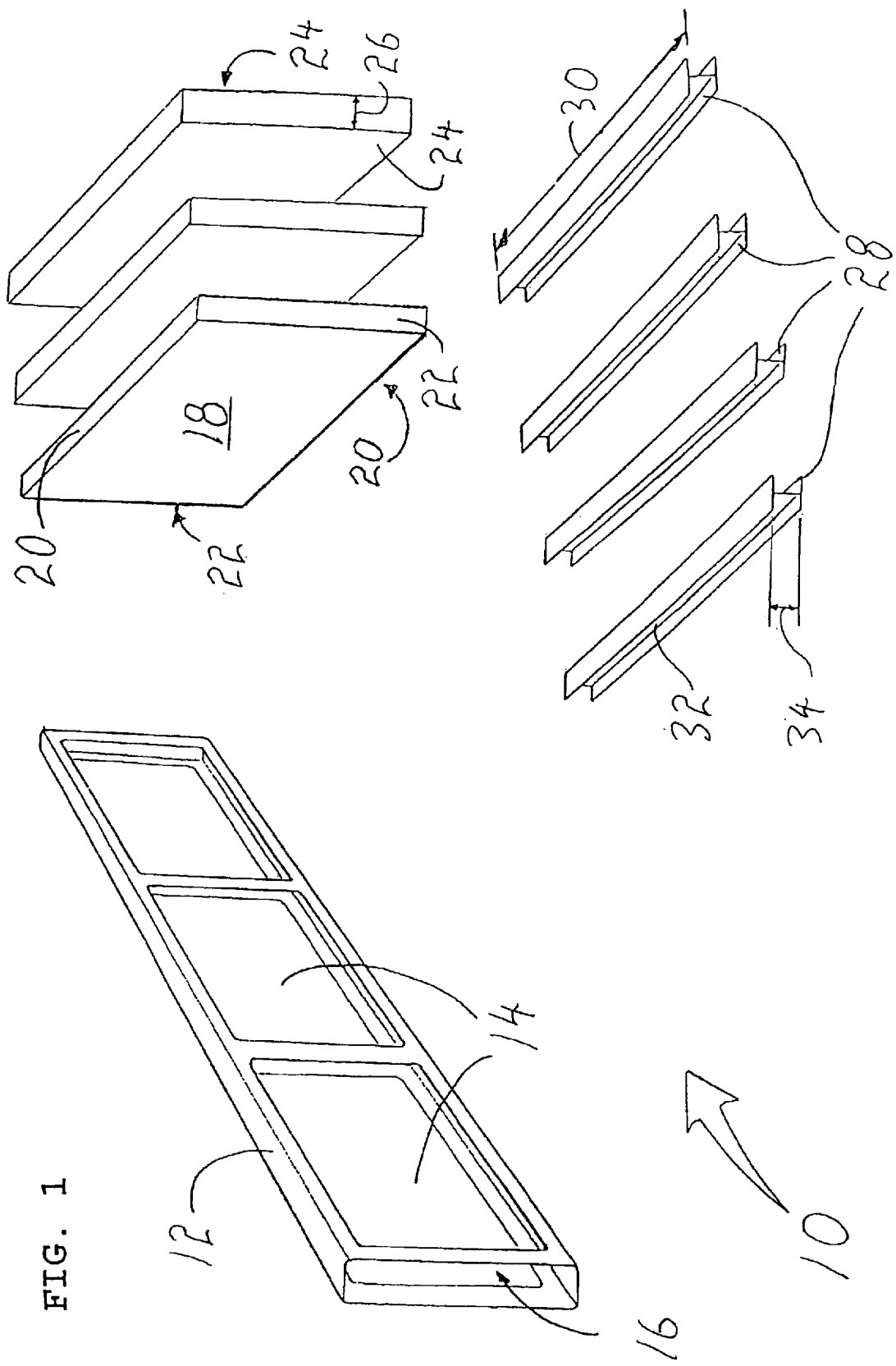
FIG. 1 is a perspective view of the components necessary to assemble the filter assembly in accordance with the teachings of the present invention.

The preferred embodiment, a filter assembly generally identified by reference numeral 10, will now be described with reference to FIGS. 1 through 5.

Figure 7:
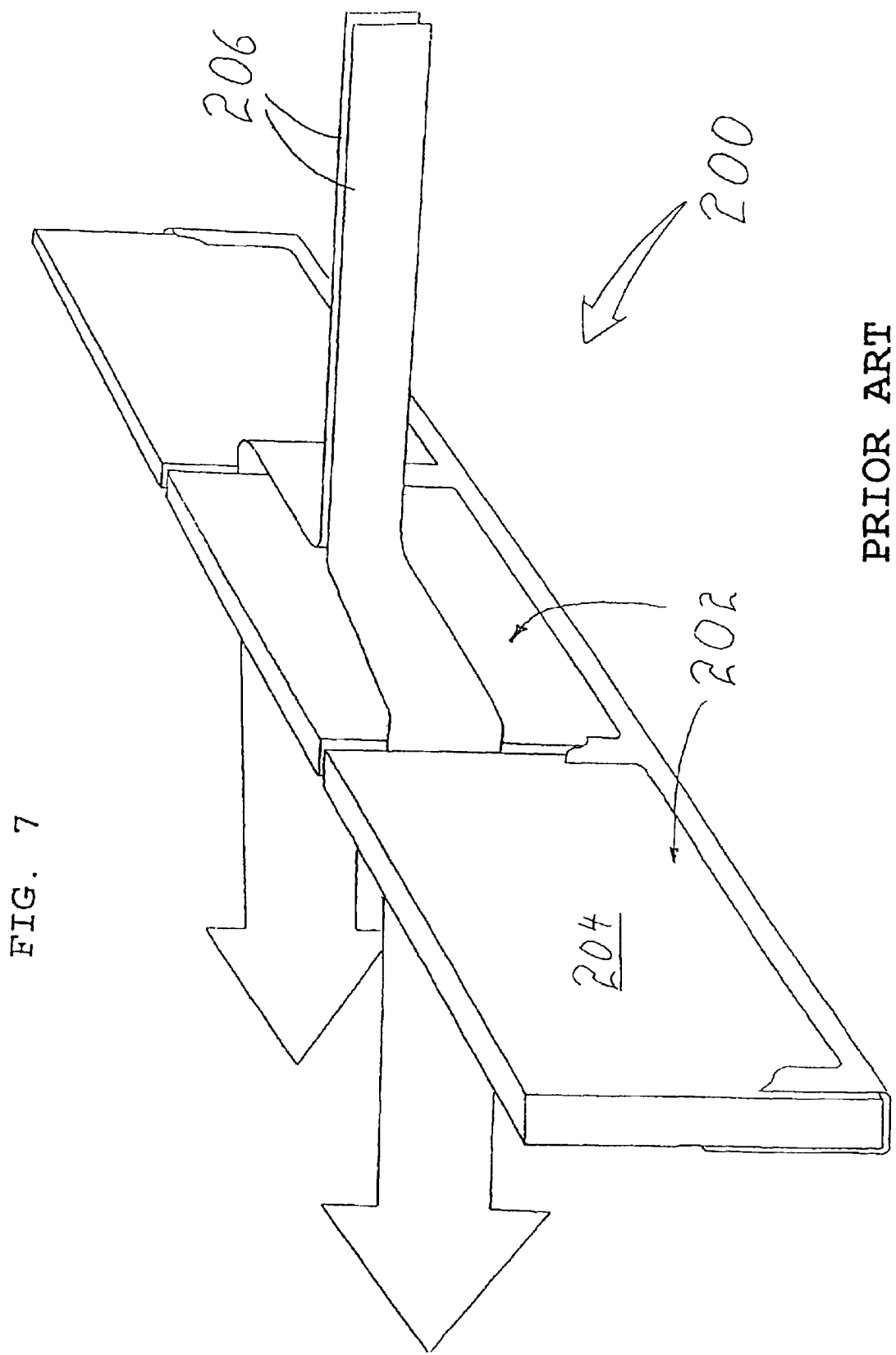
FIG. 7 labelled as PRIOR ART, is a perspective cut away view of a filter assembly in a side access filter bank.

Referring to FIG. 7, there is illustrated a PRIOR ART filter assembly in a side access filter bank. The side access filter bank is generally indicated by reference numeral 200. Filter bank 200 has a filter track 202 (one with capacity for three filters has been selected for illustration). Air flow is indicated by arrows 206. It is to be noted the air bypass which occurs between adjacent filter panels 204.

Structure and Relationship of Parts:

Referring to FIG. 1, the components which make up filter assembly 10 are illustrated: a side access filter bank 12 having a filter track 14 with a single side access opening 16. Positioned in side by side relation along the filter track are filter panels 18. Each filter panels 18 has an opposed pair of first sides 20, an opposed pair of second sides 22, two opposed faces 24, and a width 26 between the two opposed faces. In the illustrated embodiment, filter panels 18 are rectangular. "I" shaped connectors 28 having a length 30 substantially the same as the length of the opposed pair of second sides 22 of filter panels 18 and having opposed channels 32 having an inner dimension 34 substantially equal to width 26 of filter panels 18.

Figure 2:
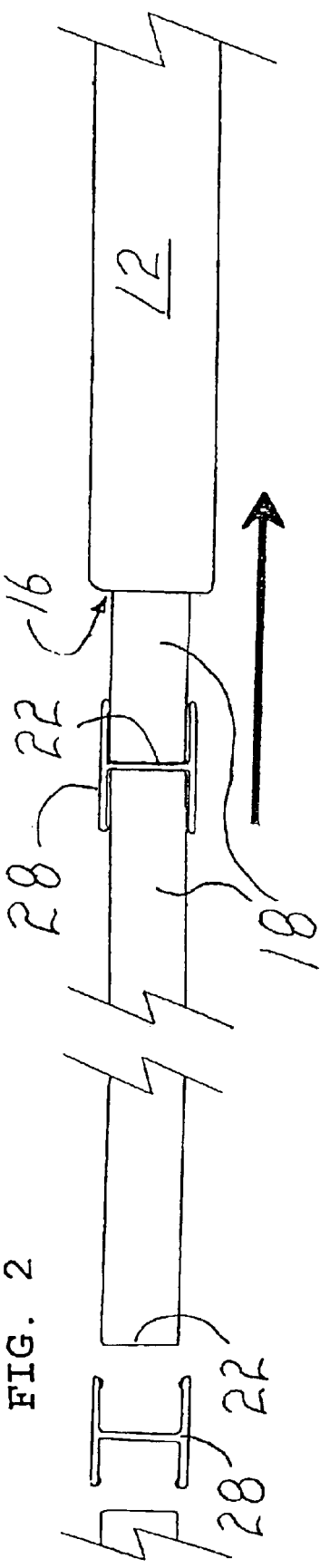
FIG. 2 is a top plan view of the filter panels being connected by "I" shaped connectors as they are inserted into the filter track of the side access filter bank.
Figure 3:
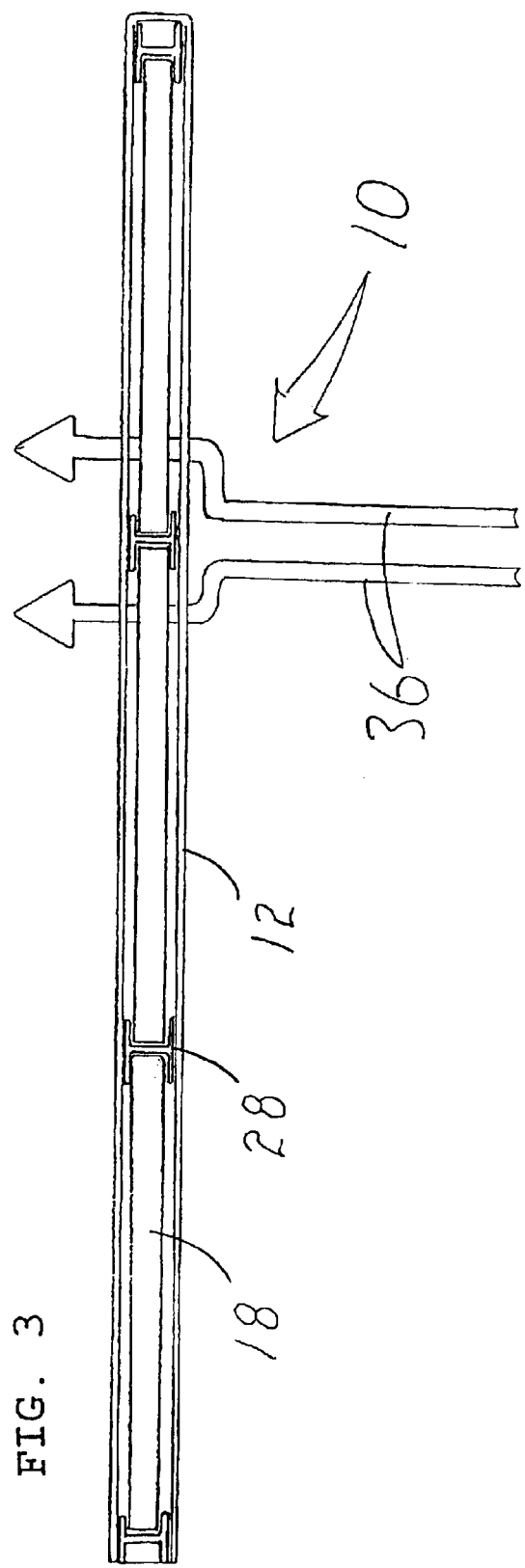
FIG. 3 is a top plan view, in section, of a filter assembly in a side access filter bank in accordance with the teachings of the present invention.
Figure 4:
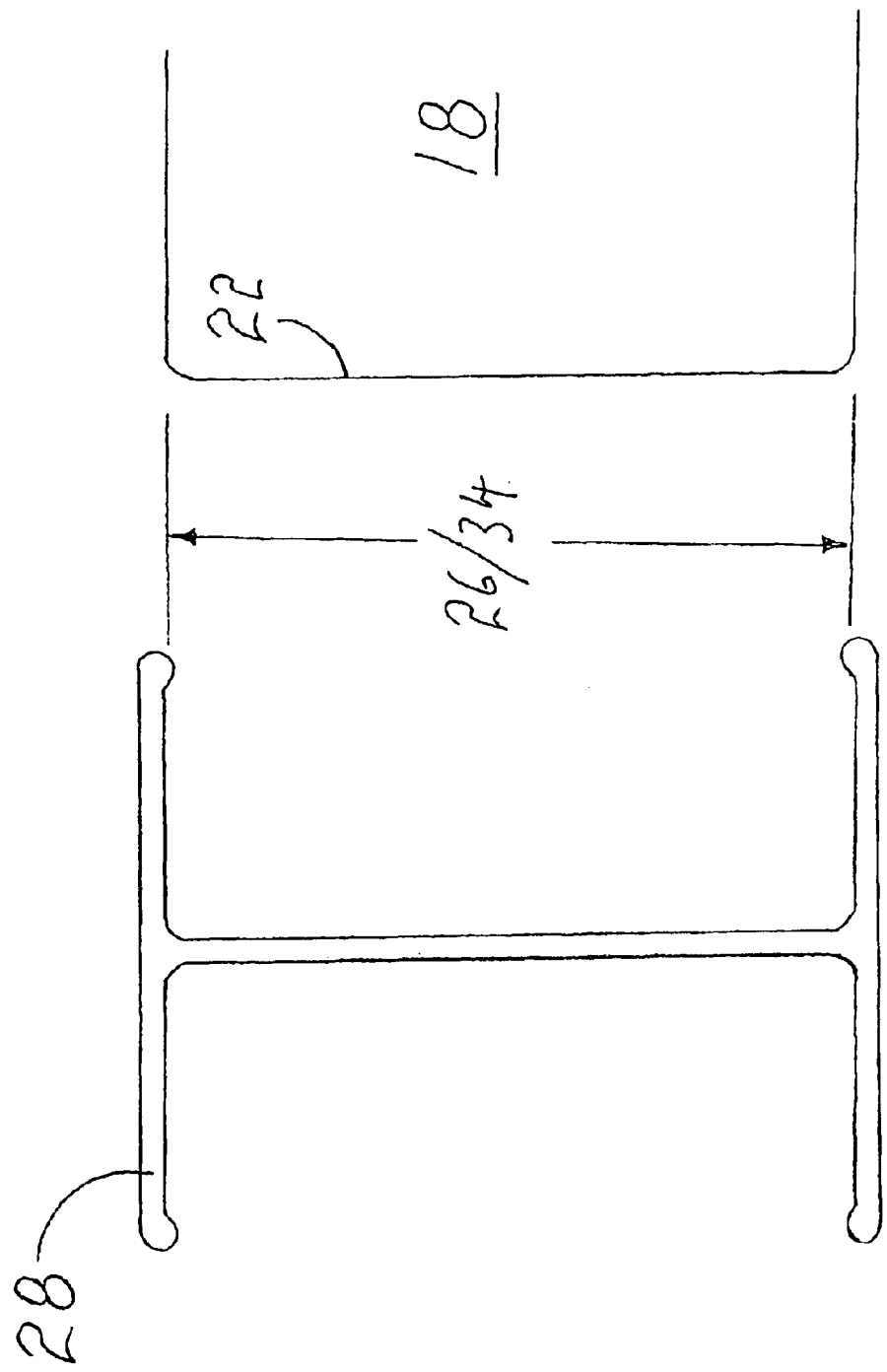
FIG. 4 is a side elevation detail view of an "I" shaped connector.

Operation:

The manner of assembly of filter assembly 10 in accordance with the teachings of the preferred method will now be described with reference to FIGS. 1 through 4. Referring to FIG. 2, each filter panel 18 is sequentially inserted into filter bank 12 through access opening 16. As each filter panel 18 is inserted, each second side 22 is fitted with an "I" shaped connector 28. Referring to FIG. 4, "I" shaped connector 28 is adapted for a close tolerance fit with each second side 22 of each filter panel 18 such that inner dimension 34 and width 26 are substantially equal resulting in a complete seal. Referring to FIG. 3, completed filter assembly 10 is shown. In the illustrated embodiment, "I" shaped connectors 28 are also used to seal the ends of the chosen filter configuration. The overall result is that air flow, following the path of least resistance as indicated by arrows 36, is directed through filter panels 18.

Variation:

The above described innovation is not limited in its application to side loading filter assemblies, it is equally applicable to front or rear loading filter assemblies. Referring to FIGS. 5 and 6, in the illustrated embodiment, filter tracks 38 are oriented so as to allow for front or rear loading. "I" shaped connectors 28 remain in close tolerance fit with filter panels 18. Referring to FIG. 6, filter panel 18 is loaded (from left to right) by tilting and installing upwards and then resting in place.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A method of preventing air bypass in a filter bank, the method comprising of the steps of:

providing a filter bank having a filter track, consisting of parallel spaced tracks, which receives filter in side by side abutting relation inserted through an access opening;

providing a plurality of rectangular filter panels, each filter panel having an opposed pair of first sides, an opposed pair of second sides, two opposed faces, and a width between the two opposed faces;

providing "I" shaped connectors, that are discrete from the filter bank, having a length substantially the same as the length of the opposed pair of second sides of the filter panels and opposed channels having an inner dimension substantially equal to the width of the filter panels; and inserting the filter panels through the access opening into the filter bank with the first sides of each filter engaging the filter tracks and sequentially connecting the filter panels in side by side relation with the "I" shaped connectors by placing the second sides of abutting filter panels into the opposed channels of the "I" shaped connectors, such that the positioning of the "I" shaped connector prevents air bypass between the second sides of adjacent filter panels.

2. A filter assembly, comprising:

a filter bank having a filter track, consisting of parallel spaced tracks, which is adapted to receive more than one filter arranged in side by side abutting relation through an access opening;

rectangular filter panels, each of the filter panels having an opposed pair of first sides, an opposed pair of second sides, two opposed faces, and a width between the opposed faces;

"I" shaped connectors, discrete from the filter bank, having a length substantially the same as the length of the opposed pair of second sides of the filter panels and opposed channels having an inner dimension substantially equal to the width of the filter panels; and the first sides of the filter panels engaging the filter tracks and the filter panels being connected in side by side relation with the "I" shaped connectors with the second sides of abutting filter panels in the opposed channels of the "I" shaped connectors, such filter the positioning of the "I" shaped connector prevents air bypass between the sides of adjacent filter panels.

3. The method as defined in claim 1, further comprising the step of providing only a single side access opening as the access opening.

4. The filter assembly as defined in claim 2, wherein the access opening is a single side access opening.

5. A method of preventing air bypass in a filter bank, the method comprising of the steps of:

providing a filter bank having a filter track consisting of parallel spaced apart tracks for receiving at least two sequential arranged and closely adjacent filter panels via an access opening in the filter bank;

providing two filter panels with each of the two filter panels having a pair of opposed first sides, a pair of opposed second sides, a pair of opposed faces, a height defined by a distance between the pair of opposed first sides and a width defined a distance between the pair of opposed faces;

providing at least one "I" shaped connector which is separated and discrete from the filter bank, the at least one "I" shaped connector having a length substantially equal to the height of the two filter panels and having a pair of opposed channels with suitable for receiving one of the second sides of the two filter panels and an internal width dimension substantially equal to the width of each of the two filter panels:

sequentially inserting the two filter panels through the access opening, one after the other, such that the first sides of each sequentially inserted filter panel engages with and are guided along with the filter track; and inserting the "I" shaped connector between the second sides of the two sequentially inserted and adjacent filter panels such that each one of the pair of opposed channels at the "I" shaped connector receives one of the second sides of the two filter panels and, during operation of the filter bank, the "I" shaped connector, restricts air from bypassing between the second sides of the two adjacent filter panels.

* * * * *